United States Patent
Malkamäki et al.

(10) Patent No.: US 9,769,720 B2
(45) Date of Patent: Sep. 19, 2017

(54) PAGING RESPONSE VIA AN OFFLOAD CELL

(71) Applicant: Nokia Technologies Oy, Espoo (FI)

(72) Inventors: Esa Malkamäki, Espoo (FI); Zexian Li, Espoo (FI); Antti Sorri, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 85 days.

(21) Appl. No.: 14/764,162

(22) PCT Filed: Feb. 19, 2013

(86) PCT No.: PCT/US2013/026741
§ 371 (c)(1),
(2) Date: Jul. 28, 2015

(87) PCT Pub. No.: WO2014/130018
PCT Pub. Date: Aug. 28, 2014

(65) Prior Publication Data
US 2015/0373600 A1    Dec. 24, 2015

(51) Int. Cl.
*H04W 36/36* (2009.01)
*H04W 36/04* (2009.01)
(Continued)

(52) U.S. Cl.
CPC ....... *H04W 36/04* (2013.01); *H04W 36/0077* (2013.01); *H04W 36/22* (2013.01);
(Continued)

(58) Field of Classification Search
CPC ..... H04W 48/20; H04W 36/08; H04W 72/00; H04W 84/12; H04W 36/22; H04W 36/36
See application file for complete search history.

(56) References Cited

U.S. PATENT DOCUMENTS

| 8,937,924 | B2* | 1/2015 | Choi | H04W 76/062 370/252 |
| 2010/0041393 | A1 | 2/2010 | Kwon et al. | |
| 2010/0323703 | A1* | 12/2010 | Pirskanen | H04W 36/0055 455/437 |
| 2015/0319686 | A1* | 11/2015 | Hedberg | H04W 48/20 370/329 |
| 2015/0373600 | A1* | 12/2015 | Malkamaki | H04W 48/20 370/331 |

FOREIGN PATENT DOCUMENTS

EP        2169972        3/2010
WO    2009071693        6/2009

OTHER PUBLICATIONS

International Search Report received for corresponding Patent Cooperation Treaty Application No. PCT/US2013/026741, dated Dec. 13, 2013, 3 pages.

(Continued)

*Primary Examiner* — Raj Jain
(74) *Attorney, Agent, or Firm* — Mintz Levin Cohn Ferris Glovsky and Popeo, P.C.

(57) ABSTRACT

Methods and apparatus, including computer program products, are provided for providing a preference to a user equipment to indicate how the user equipment should respond to a paging message and the like. The method may include receiving, at a user equipment, an indication representative of whether the user equipment should respond to a base station or respond to an access point; and accessing, based on the received indication, at least one of the base station or the access point to enable offloading to the access point. Related apparatus, systems, methods, and articles are also described.

20 Claims, 3 Drawing Sheets

(51) Int. Cl.
- H04W 48/20 (2009.01)
- H04W 36/00 (2009.01)
- H04W 36/22 (2009.01)
- H04W 36/08 (2009.01)
- H04W 84/04 (2009.01)

(52) U.S. Cl.
CPC ........... *H04W 36/36* (2013.01); *H04W 48/20* (2013.01); *H04W 36/08* (2013.01); *H04W 84/045* (2013.01)

(56) References Cited

OTHER PUBLICATIONS

3GPP, "Technical Specification Group Radio Access Network; Evolved Universal Terrestrial Radio Access (E-UTRA); Radio Resource Control (RRC); Protocol specification (Release 12)," 3rd Generation Partnership Project, 3GPP TS 36.331 V11.2.0, Dec. 2012.

3GPP, "Technical Specification Group Radio Access Network; Evolved Universal Terrestrial Radio Access (E-UTRA); Physical layer; Measurements (Release 13)," 3rd Generation Partnership Project, 3GPP TS 36.214 V11.1.0, Dec. 2012.

3GPP, "Technical Specification Group Radio Access Network; Evolved Universal Terrestrial Radio Access (E-UTRA); Physical layer procedures (Release 8)," 3rd Generation Partnership Project, 3GPP TS 36.213 V11.1.0, Dec. 2012.

3GPP, "Technical Specification Group Radio Access Network; Evolved Universal Terrestrial Radio Access (E-UTRA); Physical channels and modulation (Release 13)," 3rd Generation Partnership Project, 3GPP TS 36.211 V11.1.0, Dec. 2012.

3GPP, "Technical Specification Group Radio Access Network; Evolved Universal Terrestrial Radio Access (E-UTRA); Multiplexing and channel coding (Release 13)," 3rd Generation Partnership Project, 3GPP TS 36.212 V11.1.0, Dec. 2012.

3GPP, "Technical Specification Group Radio Access Network; Evolved Universal Terrestrial Radio Access (E-UTRA); LTE physical layer; General description (Release 13)," 3rd Generation Partnership Project, 3GPP TS 36.201 V11.1.0, Dec. 2012.

* cited by examiner

PAGING RESPONSE VIA AN OFFLOAD CELL

RELATED APPLICATION

This application was originally filed as PCT Application No. PCT/US2013/026741 filed Feb. 19, 2013.

FIELD

The subject matter disclosed herein relates to wireless communications, and, in particular, offloading to small cells.

BACKGROUND

The expected increase in wireless data transmissions may mean that there will be a need to deploy more network capacity. One efficient way to increase the network capacity is by deploying small cells for offloading purposes or offloading cells in general. These small cells can be deployed on the same or separate carriers relative to the serving cell, and the mixed environment with macro/large cells and small cells are often referred to heterogeneous networks (hetnets). Use of hetnets may provide opportunities for offloading traffic from the macrocells to, for example, a higher speed or a higher capacity small cell.

The heterogeneous network may include one or more wireless access points, or base stations, such as for example an E-UTRAN (evolved Universal Mobile Telecommunications System Terrestrial Radio Access Network) NodeB base station serving macrocells, and one or more small cell base stations serving small cells. For example, a small cell base station (or a wireless access point or a remote radio head, for example) may be implemented to cover a small cell, or coverage area, examples of which include a residence, a small business, a building, an office, or a small area. The small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less/smaller coverage/range and lower power capabilities given its limited coverage area or class. For example, the small cell base station may be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage into a small cell, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

Methods and apparatus, including computer program products, are provided for providing a preference to a user equipment to indicate how the user equipment should respond to a paging message and the like. The method may include receiving, at a user equipment, an indication representative of whether the user equipment should respond to a base station or respond to an access point; and accessing, based on the received indication, at least one of the base station or the access point to enable offloading to the access point.

In some variations, one or more of the featured disclosed herein including one or more of the following features can optionally be included in any feasible combination. The user equipment may receive a paging message including the received indication sent by the base station. The indication may represent a preference for whether the user equipment should respond to the base station or respond to the access point. The indication may include an identifier representative of a base station identifier, and the base station identifier may be associated with the preference for whether the user equipment should respond to the base station or respond to the access point. When the indication represents that the preference is to respond to the access point, the user equipment responds to the base station, when the access point is not accessible. The access point may include a small cell access point serving a small cell. The user equipment may receive access information including information identifying one or more access points. The access information may be received in at least one of a paging message, a random access response, a message, and a system message. The access information may be received in the random access response, and the paging message may include a dedicated preamble to be used by the user equipment. The access information may include at least one of information about one or more access points, security information to allow coupling to the one or more access points, a carrier frequency of the one or more access points, a service set identifier of the one or more access points, and a radio access technology of the one or more access points.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

To avoid frequent cell reselections and improve the user equipment power efficiency, a network may keep a user equipment, such as a mobile wireless device, smart phone, and the like, in an idle mode camped on a macrocell served by a base station, such as an evolved node B base station and the like, rather than allowing the user equipment to camp on a small cell served by an access point, such as a WiFi wireless access point or a home base station serving a small cell (for example, a long term evolution (LTE) enhanced local area (eLA)). While the user equipment is camped on the macrocell, the network may broadcast a page via a macro, large cell base station. The user equipment may then respond to the page by initiating a random access procedure with the macro base station serving the macrocell, and then the user equipment may send a radio resource control (RRC) connection request message to the network, including the macro base station, to establish the RRC connection in the same macrocell where the user equipment received the page. After this RRC connection is established with the macro base station, the network may then initiate an offload of data traffic to another target cell, such as a small cell. However, this aforementioned offloading process may be considered to generate unnecessary signaling load with respect to the macrocell and macro base station because the signaling is only used to establish the RRC connection, which is quickly terminated to enable offloading to the small cell.

In some example embodiments, the subject matter disclosed herein may provide information to the user equipment to enable the user equipment to determine whether the user equipment should respond to the page directly via the macrocell or directly via the small cell in order to facilitate offloading of user equipment to the small cell.

Figure 1:
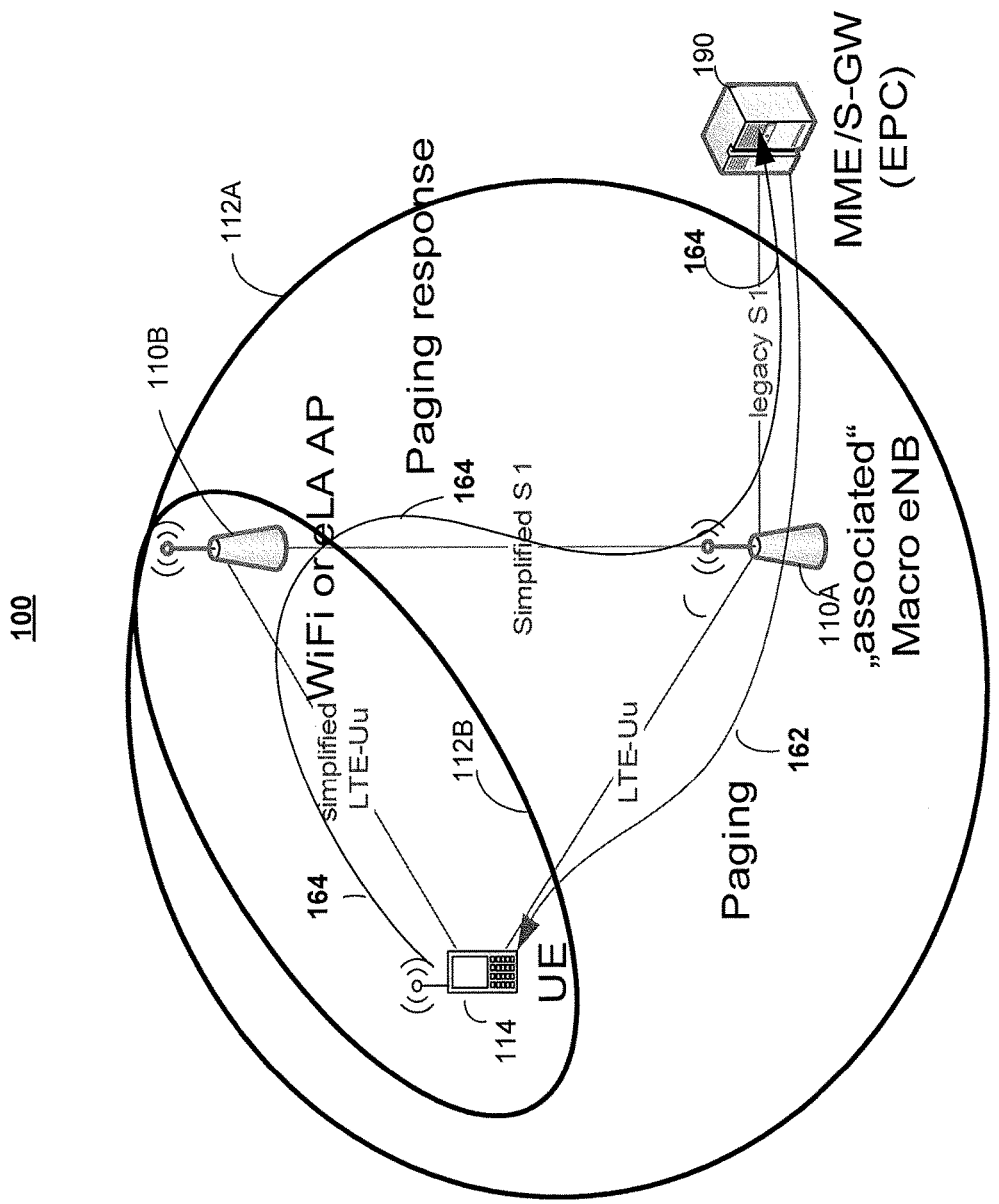
FIG. 1 depicts an example of a system, in accordance with some example embodiments.

FIG. 1 depicts a system 100, in accordance with some example embodiments. A network node, such as a mobility management entity (MME) 190, may send a paging request message 162 to a macro base station 110A, which then pages 162 user equipment 114, while user equipment 114 is camped in an idle mode on the macrocell 112A being served by macro base station 110A.

In some example embodiments, the page 162 may include an indication of whether a response to the page 162 is to be provided via the access point 110B serving the small cell 112B or via the macro base station 110A serving the macrocell 112A. When the page 162 is received, the user equipment 114 may read the page 162 and determine whether a response to the page 162 is to be provided to access point 110B or macro base station 110A. If the response 164 is to be sent to small cell 112B and access point 110B, the user equipment 114 may then connect to the access point 110B (for example, by performing a random access procedure to access point 110B serving the small cell 112B or any other coupling/alignment/attach procedure specific to the radio access technology of the access point 110B). Next, this paging response 164 may further include an RRC connection request sent directly to access point 110B, which then forwards the RRC connection request to other nodes in the network, including base station 110A and/or a mobility management entity 190. When the page includes an indication for the user equipment 114 to respond via the small cell 112B, the network effectively instructs the user equipment 114 to offload to cell 112B.

In some example embodiments, network bearers, such as LTE enhanced packet system (EPS) bearers, are established directly via the small cells (for example, via WiFi or eLA cells) after receiving the page 162 including the indication to respond to the page via the small cell 112B. These bearers may be established in the small cell 112B without requiring user equipment 114 to first establish an RRC connection with macro base station 110A. Although FIG. 1 depicts the interface between the access point 110B and the MME 190 as being via the base station 110A, access point 110B may also have a direct interface to the MME 190 (or serving gateway) and/or access MME 190 via other nodes as well. For example, access point 110B may couple directly to MME 190 (for example, via an S1-c interface) and/or to a serving gateway (for example, via an S1-u interface). The access point 110B may be connected to a small cell aggregator/concentrator which may be connected to MME and/or serving gateway.

In some example embodiments, the page 162 may include the indication of whether to respond directly to small cell 112B/access point 110B or macrocell 112A/base station 110A and further include small cell information. This small cell information may include small cell access point information, such as information about the one or more small cell access point(s) within macrocell 112A, security information to allow coupling to a small cell, carrier frequency of the small cells, information specific to a certain small cell access point within macrocell 112A, and/or any other information that may facilitate access to the small cell 112B and/or access point 110B.

Although the previous example describes the small cell information carried in page 162, the small cell information may, in some example embodiments, be carried in other messages as well. For example, user equipment 114 may receive page 162, without the small cell information. In this example, the user equipment 114 may respond by initiating a random access procedure with the macro base station 110A. But the macrocell 112A/base station 110A may promptly respond with a random access response including the small cell information, in accordance with some example embodiments.

In some example embodiments, the small cell information may be configured as an information element. For example, page 162 may include the small cell information as an information element (IE). This information element may indicate, for example, whether the paging response 164 should be sent via the macrocell/macro base station 110A or the small cell/access point 110B. For example, the paging record described in 3GPP TS 36.331 may include a user equipment identifier (for example, UE id), a domain for the one or more user equipment being paged, and the like. In some example embodiments, this paging record may be augmented to include information indicative of whether the paging response should be sent via the macrocell or the small cell as the paging record is specific to a given user equipment. Table 1 below depicts an example of an information element, which may be carried by page 162. This information element may include the "PagingRecord" augmented with a "Response via small cell" to provide the additional small cell information regarding whether the paging response 164 should be sent directly to the macrocell/base station 110A or to the small cell/access point 110B.

TABLE 1

```
Paging ::=                   SEQUENCE {
    pagingRecordList             PagingRecordList          OPTIONAL, -- Need
ON
    systemInfoModification   ENUMERATED {true}             OPTIONAL, -- Need
ON
    etws-Indication          ENUMERATED {true}             OPTIONAL, -- Need
ON
    nonCriticalExtension         paging-v890-IEs           OPTIONAL
}
PagingRecord ::=             SEQUENCE {
    ue-Identity                  PagingUE-Identity,
    cn-Domain                    ENUMERATED {ps, cs},
    Response via small cell      ENUMERATED {true,
    . . .
}
```

In some example embodiments, the page 162 may, as noted, include small cell information to enable the user equipment 114 to find and connect to a cell, such as small cell 112B and its access point 110B. For example, the page 162 may include small cell information representative of the small cell and/or the access point. This small cell information may include one or more of the following: a carrier frequency, a service set identifier (SSID) of a WiFi AP, a physical cell id (PCI), a PCI range, random access resources in the small cell, one or more security settings/information, synchronization information, resource allocation information, and/or any other information to allow the user equipment 114 to couple to or identify a small cell, such as small cell 112B and its access point 110B. In some example embodiments, the information element depicted in Table 1 may also be augmented to include the small cell information disclosed herein.

The small cell information may also be provided by the network to the user equipment 114 in other types of messages, such as a system information (SI) message. When the SI message is used, the SI message including the small cell information may be broadcast to one or more user equipment in macrocell 112A. In some example embodiments, the small cell information may be carried by a random access response message to user equipment 114. When this is the case, the page 162 may include an indicator, such as a dedicated preamble and/or a dedicated radio resource, to be used for random access or a set of preambles, which may be random and/or separate from normal contention based preambles to allow identification. This dedicated preamble may enable the network, such as base station 110A and the like, to identify the entity initiating the random access from among a plurality of user equipment.

When the user equipment is in an idle mode camping in a macro cell, it may not be aware of small cells. In order to speed-up the paging response, it may be beneficial, in some example embodiments, to allow the user equipment to perform some small cell measurements and receive system information broadcasted by the macro base station. Based on this information, the user equipment may know the carrier frequency and other relevant system parameters of the small cells. Thus, the user equipment may make some (for example, infrequent) measurements of the small cells and thus detect whether it is in the coverage area of a small cell. Alternatively, the user equipment may start cell detection, when it receives paging but that would take some time and would delay the paging response. If the user equipment is camping in the macro cell and is not experiencing a good enough connection to a small cell, then the user equipment may respond to the paging in the macro cell by making the random access to macro base station, even in the case that the macro eNB indicates a preference for the user equipment to respond via small cell. Thus, the indication may be understood as a preference and in particular, a preference by the network or base station regarding how it would prefer to receive the paging response/random access, unless the eNB has some other knowledge of the UE position. For example, the indication may be received by the user equipment, but the user equipment may still respond to a base station (for example, when a small cell is not accessible or detectable).

Before providing additional examples, the following provides additional description with respect to the example system framework 100 depicted at FIG. 1.

System 100 may include one or more user equipment, such as for example user equipment 114, and one or more access points, such as for example base stations 110A-B. In some example embodiments, base station 110A may serve a cell, such as for example macrocell 112A, and wireless access point/base station 110B may serve a small cell 112B, such as for example a picocell, a femtocell, a home base station cell, LTE enhanced local area (eLA) cell, and the like, although base stations 110A-B may serve other types of cells as well. In other examples the cells (that being either macrocells or small cells) may be co-located. Moreover, the base stations 110A-B may have wired and/or wireless backhaul links to other network nodes, such as for example a mobility management entity, other base stations, a radio network controller, a core network, a serving gateway, and/or the like. The macrocell 112A and small cell 112B may be on the same or different carriers.

In some example embodiments, the user equipment 114 may be implemented as a mobile device and/or a stationary device. The user equipment can be referred to as, for example, mobile stations, mobile units, subscriber stations, wireless terminals, tablets, smart phones, a wireless handheld device, a wireless plug-in accessory, or the like. In some example embodiments, the user equipment 114 may be implemented as multi-mode user devices configured to operate using a plurality of radio access technologies, although a single-mode device may be used as well. For example, user equipment 114 may be configured to operate using a plurality of radio access technologies including one or more of the following: Long Term Evolution (LTE), wireless local area network (WLAN) technology, such as for example 802.11 WiFi and/or the like, Bluetooth, Bluetooth low energy (BT-LE), near field communications (NFC), and any other radio access technologies. Moreover, the user equipment 114 may be configured to have established connections to access points using a plurality of the radio access technologies.

The base stations 110A-B may, in some example embodiments, be implemented as an evolved Node B (eNB) type base station, although other types of radio, access points may be implemented as well. When the evolved Node B (eNB) type base station is used, the base stations, such as for example base stations 110A-B, may be configured in accordance with standards, including the Long Term Evolution (LTE) standards, such as for example 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer—Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). The base stations 110A-B may also be configured to serve cells using a WLAN technology, such as for example WiFi (for example, the IEEE 802.11 series of standards), as well as any other radio access technology capable of serving a cell.

In some example embodiments, system 100 may include access links. The access links may include a downlink for transmitting to the user equipment 114 and an uplink for transmitting from user equipment 114 to a base station. The downlink may comprise a modulated radio frequency carrying information, such as for example user data, radio resource control (RRC) messages, information configuring a user equipment, handover commands, and/or the like, to user equipment 114, and the uplink may comprise a modulated radio frequency carrying information, such as for example user data, RRC messages, user equipment capabilities reporting, measurement reports, and/or the like, from the user equipment 114 to a base station. The downlinks and uplinks may, in some example embodiments, each represent a radio frequency (RF) signal. The RF signal may, as noted above, carry data, such as for example voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies.

Although FIG. 1 depicts a specific quantity and configuration of base stations, cells, and user equipment, other quantities and configurations may be implemented as well.

Figure 2:
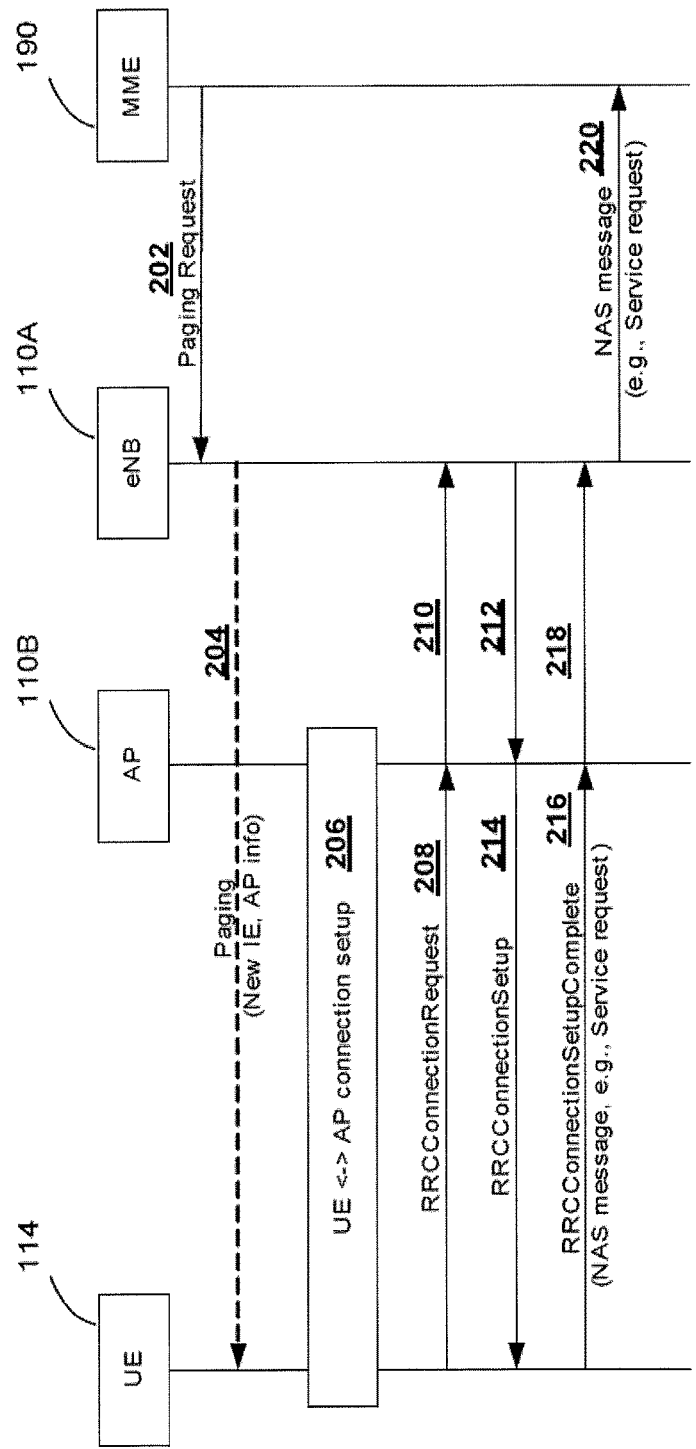
FIG. 2 depicts an example of a process, in accordance with some example embodiments.

FIG. 2 depicts an example of a process 200 for providing an indication to a user equipment, so that the user equipment can determine whether it should respond to the page via a small cell access point or a macro base station, in accordance with some example embodiments. The description of FIG. 2 also refers to FIG. 1.

At 202, a network node, such as the mobility management entity (MME) 190, may send a paging request to the base station 110A. This paging request may include an indication to offload to a small cell, although the paging request may be configured to not include the offload indication as well. In the latter case, the MME 190 may have already established an offloading preference, and this preference may be established based on, for example, bearer type. For instance, a best effort bearer may be offloaded directly to a small cell, while a voice call may be made through a macro cell.

At 204, base station 110A (or any other base station in the tracking area) may then send, in response to the paging request received at 202, a page 204 to one or more user equipment including user equipment 114, in accordance with some example embodiments. The page 204 may include an indication of whether the user equipment 114 should respond to the page 204 by responding directly to macro base station 110A serving macrocell 112A or via access point 110B serving small cell 112B. The page 204 may also include small cell information including one or more of the following: small cell access point information, such as information about the one or more small cell access point(s) within macrocell 112A; security information to allow coupling to the small cell; information specific to a certain small cell access point within macrocell 112A; a carrier frequency; a service set identifier (SSID); information regarding a specific access procedure or radio access technology to be used with the small cell; and/or any other information that may facilitate enhanced access to the small cell 112B (although the small cell information may be provided in other ways and at other times as well as noted herein). Moreover, the small cell information may be configured as an information element, such as the information element depicted at Table 1. The indication noted above may be specially configured to indicate a preferred response path, or, the indication may comprise a base station identifier, which may be associated with the network or cells preference for responding via the small cell or the macro cell.

At 206, the user equipment 114 may respond to the page, in accordance with some example embodiments. For example, the user equipment 114 may read the page 204 (or other indication provided by the base station) and determine that the page includes an indication to respond to small cell access point 110B, in accordance with some example embodiments. When this is the case, the user equipment 114 may respond by connecting, at 206, to small access point 110B using an access procedure specific to the type of small cell access point 110B. For example, when the access point 110B is configured as a WiFi access point, the user equipment 114 may access the small cell access point 110B in accordance WiFi and its associated standards, but may access small cell access point 110B using a different procedure when small cell base station 110B is a home eNB base station compatible with LTE.

At 208, a connection request, such as a RRC connection request, may be sent to small cell access point 110B, in accordance with some example embodiments. The small cell access point 110B may then forward the RRC connection request at 210 to the eNB base station 110A, in accordance with some example embodiments.

At 212-214, the base station 110A may, in some example embodiments, respond with a message, such as an RRC connection setup message, to the access point 110B and user equipment 114.

At 216-218, the user equipment 114 may respond with a message, such as an RRC connection setup complete message, which is sent to access point 110B and base station 110A. The RRC connection setup complete message may include a non-access stratum (NAS) message, which is extracted and then forwarded by the base station 110A to a network node, such as MME 190.

In FIG. 2, the RRC connection request, setup, and complete messages may be passed via the small cell access point to macro base station. Alternatively, if the small cell is an LTE-based small cell, the small cell access point (or base station) may handle the RRC connection request, setup, and complete messages. There may also be a direct connection, as noted, between the small cell access point and the MME and/or serving gateway (S-GW), in which case the small cell access point may directly forward the non-access stratum (NAS) message to the MME.

In some example embodiments, the page 204 may not include the small cell information as noted above. When this is the case, user equipment 114 may, after receiving the page 204, initiate a random access procedure with base station 110A, which may then respond with the small cell information (for example, as part of system information), to enable the user equipment 114 to couple to the access point 110B at 206.

Figure 3:
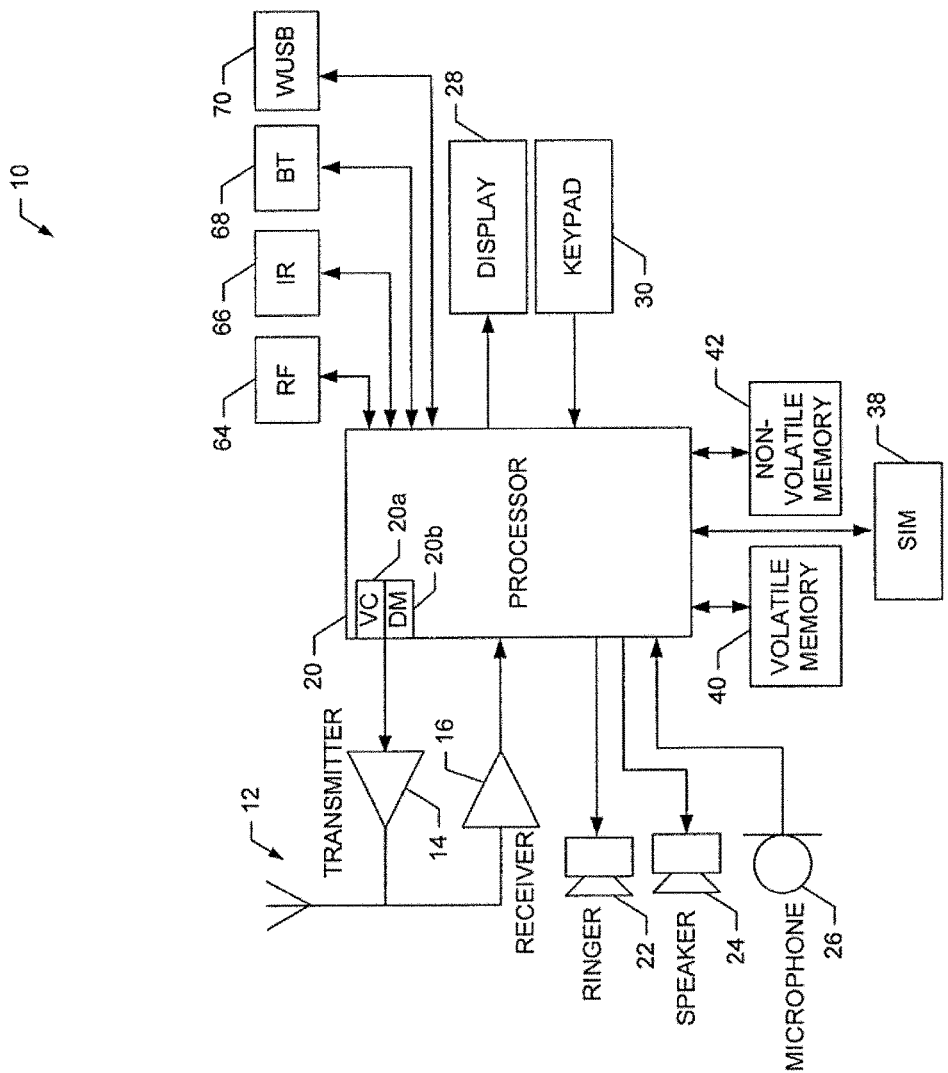
FIG. 3 depicts an example of an apparatus, in accordance with some example embodiments.

FIG. 3 illustrates a block diagram of an apparatus 10 such as, for example, a user equipment, in accordance with some example embodiments. While several features of the apparatus are illustrated and will be hereinafter described for purposes of example, other types of electronic devices, such as for example mobile telephones, mobile computers, portable digital assistants (PDAs), pagers, laptop computers, desktop computers, gaming devices, televisions, routers, home gateways, and other types of electronic systems, may employ one or more of the embodiments disclosed herein.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. More particularly, the apparatus 10 may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. (GPRS), Enhanced Data GSM Environment (EDGE), and/or the like. Further, for example, the apparatus 10 may be capable of operating in accordance with 3G wireless communication protocols, such as for example Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

Some Narrow-band Advanced Mobile Phone System (NAMPS) and Total Access Communication System (TACS) mobile terminal apparatuses may also benefit from one or more embodiments disclosed herein as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example a web browser. The connectivity program may allow the apparatus 10 to transmit and receive web content, such as for example location-based content, according to a protocol, such as for example wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may include user interface circuitry configured to control at least some functions of one or more elements of the user interface, such as for example, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example a keypad 30, a touch display, a joystick, and/or at least one other input device. In some embodiments including a keypad, the keypad may include numeric 0-9 and related keys, and/or other keys for operating the apparatus 10.

As shown in FIG. 3, apparatus 10 may also include one or more mechanisms for sharing and/or obtaining data. For example, the apparatus 10 may include a short-range radio frequency (RF), transceiver, and/or interrogator 64, so data may be shared with and/or obtained from electronic devices in accordance with RF techniques. The apparatus 10 may include other short-range transceivers, such as for example, for example, an infrared (IR), transceiver 66, a Bluetooth (BT), transceiver 68 operating using Bluetooth wireless technology, a wireless universal serial bus (USB) transceiver 70 and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters, for example. The apparatus 10 may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example, the functions disclosed at process 200 (for example, read the page 204 to determine whether to respond via the small cell access point or the macro base station and the like). The memories may comprise an identifier, such as for example an international mobile equipment identification (IMEI) code, capable of uniquely identifying apparatus 10.

Without in any way limiting the scope, interpretation, or application of the claims appearing below, a technical effect of one or more of the example embodiments disclosed herein is a reduction in the signaling load.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any media that can contain, store, communicate, propagate or transport the instructions for use by or in connection with an instruction execution system, apparatus, or device, such as for example a computer, with one example of a computer described and depicted in FIG. 3. A computer-readable medium may comprise a non-transitory computer-readable storage medium that may be any media that can contain or store the instructions for use by or in connection with an instruction execution system, apparatus, or device, such as for example a computer. And, some of the embodiments disclosed herein include computer programs configured to cause methods as disclosed herein (see, for example, process 200 and the like).

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:
1. A method comprising:
receiving, at a user equipment and from a macro cell base station, a paging message comprising an indication of whether the user equipment should respond to the paging message through the macro cell base station or through a small cell access point;

initiating, by the user equipment and in response to the indication indicating that the user equipment should respond to the macro cell base station, a first connection procedure with the macro cell base station; and initiating, by the user equipment and in response to the indication indicating that the user equipment should respond to the small cell access point, a second connection procedure with the small cell access point, wherein accessing the small cell access point enables offloading from the macro base station to the small cell access point.

2. The method of claim 1, wherein the paging message is received while the user equipment is in an idle mode, and wherein the paging message indicates a call and/or data available for the user equipment.

3. The method of claim 1, wherein the indication represents a preference for whether the user equipment should respond to the paging message through the macro cell base station or respond to the paging message through the small cell access point.

4. The method of claim 3, further comprising:

determining, at the user equipment and in response to the indication indicating that the user equipment should respond to the small cell access point, that the small cell access point is not accessible or not suitable for communications; and accessing, by the user equipment in response to the determining, the macro cell base station instead.

5. The method of claim 1, wherein the indication comprises an identifier representative of the macro cell base station.

6. The method of claim 1, wherein initiating the first connection procedure comprises transmitting a radio resource control connection request message to the macro cell base station, and wherein initiating the second connection procedure comprises transmitting request for establishment of one or more network bearers to the small cell access point.

7. The method of claim 1 further comprising:

receiving, at the user equipment, access information including information identifying one or more access points.

8. The method of claim 7, wherein the access information is received in at least one of the paging message, a random access response, and a system message.

9. The method of claim 7, wherein the access information is received in a random access response, wherein the paging message includes a dedicated preamble, and wherein at least one of the first connection procedure or the second connection procedure comprises the user equipment transmitting the dedicated preamble.

10. The method of claim 7, wherein the access information includes one or more indications of at least one of: security information to allow coupling to the one or more access points, at least one carrier frequency of the one or more access points, at least one service set identifier of the one or more access points, and at least one radio access technology of the one or more access points.

11. An apparatus, comprising:

at least one processor; and at least one memory including computer program code, the at least one memory and the computer program code configured to, with the at least one processor, cause the apparatus to at least:

receive, from a macro cell base station, a paging message comprising an indication of whether the apparatus should respond to the paging message through the macro cell base station or through a small cell access point;

initiate, in response to the indication indicating that the apparatus should respond to the macro cell base station, a first connection procedure with the macro cell base station; and initiate, in response to the indication indicating that the apparatus should respond to the small cell access point, a second connection procedure with the small cell access point, wherein accessing the small cell access point enables offloading from the macro base station to the small cell access point.

12. The apparatus of claim 11, wherein the paging message is received while the apparatus is in an idle mode, and wherein the paging message indicates a call or data available for the apparatus.

13. The apparatus of claim 11, wherein the indication represents a preference for whether the apparatus should respond to the paging message through the macro cell base station or respond to the paging message through the small cell access point.

14. The apparatus of claim 13, wherein the apparatus is further caused to at least:

determine, in response to the indication indicating that the user equipment should respond to the small cell access point, that the small cell access point is not accessible or not suitable for communications, and access, based on the determining, the macro cell base station instead.

15. The apparatus of claim 11, wherein the indication comprises an identifier representative of the macro cell base station.

16. The apparatus of claim 11, wherein initiation of the first connection procedure comprises transmission of a radio resource control connection request message to the macro cell base station, and wherein initiation of the second connection procedure comprises transmission of a request for establishment of one or more network bearers to the small cell access point.

17. The apparatus of claim 11, wherein the apparatus is further caused to at least receive access information including information identifying one or more access points.

18. The apparatus of claim 17, wherein the access information is received in at least one of the paging message, a random access response, and a system message.

19. The apparatus of claim 17, wherein the access information is received in a random access response, wherein the paging message includes a dedicated preamble, and wherein at least one of the first connection procedure or the second connection procedure comprises transmission of the dedicated preamble.

20. A non-transitory computer-readable storage medium including program code which when executed by at least one processor causes operations comprising:

receiving, at a user equipment from a macro cell base station, a paging message comprising an indication of whether the user equipment should respond to the paging message through the macro cell base station or through a small cell access point;

initiating, by the user equipment in response to the indication indicating that the user equipment should respond to the macro cell base station, a first connection procedure with the macro cell base station; and initiating, by the user equipment in response to the indication indicating that the user equipment should respond to the small cell access point, a second connection procedure with the small cell access point, wherein accessing the small cell access point enables offloading from the macro base station to the small cell access point.

\* \* \* \* \*